Patented Aug. 16, 1927.

1,639,206

UNITED STATES PATENT OFFICE.

ARTHUR WOLFRAM, OF HOCHST, GERMANY, ASSIGNOR TO THE FIRM DURAND & HUGUENIN S. A., OF BASEL, SWITZERLAND.

MANUFACTURE OF STABLE DERIVATIVES OF VAT DYESTUFFS.

No Drawing. Application filed March 11, 1927, Serial No. 174,698, and in Germany March 17, 1926.

The French Patent Specification No. 551.666 describes esterlike and water-soluble derivatives of vat dyestuffs, which result from their leuco-compounds by the treatment thereof with chlorosulphonic acid. These products are largely used for dyeing and printing.

It has now been ascertained that the same derivatives of vat dyestuffs are obtained if their leuco compounds are caused to react with aminosulphonic acid ($NH_2-SO_3H$), which can easily be prepared according to the method of Raschig (see Liebig's Annalen, vol. 241, pag. 61, 1887), in the presence of a tertiary base, such as for instance pyridine or dimethylaniline.

The ammonium salts of the acid sulphuric acid esters are thus obtained. It is advantageous to perform the reaction in an indifferent solvent, such as for instance chlorobenzene. The resulting sulphuric acid ester-salts of the leuco compounds are identical to those produced with chlorosulphonic acid, and are used, like these products, for dyeing and printing purposes.

The following examples serve to illustrate the invention, the parts being by weight.

Example I.

29 parts of the leuco compound of tetrabromindigo are finely divided in 150 parts of chlorobenzene; then 40 parts of pyridine are added. The mixture is heated up to 75-80° C. Then I add to the mixture at the above temperature, in the course of 3-4 hours, while stirring, 15 parts of finely powdered aminosulphonic acid. The mass of reaction is further stirred during an hour at the above temperature, and then 2 parts of ammonia (25%) are added in order to neutralize any free amino sulphonic acid which might still be present. Finally chlorobenzene and pyridine are removed by steam. The result is a clear, nearly colorless, watery solution which contains the ammonium salt of the sulphuric acid ester of tetrabromindigo white. When cooling down, the same precipitate partially in the form of colorless flakes. To obtain the best yield the solution is evaporated to dry state. If 10 parts of anhydrous sodium carbonate are added previously to the steam distillation, then the sodium salt of the sulphuric acid ester is formed, which is also isolated by evaporation of the solution.

Example II.

30 parts of the leuco compound of thio-indigo are suspended in a mixture of 200 parts of chlorobenzene and 50 parts of pyridine. Then, I add at 85° C., in the course of 4-5 hours, in small parts and while stirring, 30 parts of powdered aminosulphonic acid and stir further for an hour. The excess of aminosulphonic acid is neutralized with watery ammonia, and chlorobenzene as well as pyridine are removed as described in Example I. The clear, watery solution is evaporated to dry state and I thus obtain the ammonium salt of the sulphuric acid ester of leuco thio-indigo.

Example III.

20 parts of finely powdered aminosulfonic acid are heated while stirring to 80° C. with 150 parts of pyridine. There are then introduced into the mass 26 parts of the leuco compound of dimethoxydibenzanthrone and the mixture is further heated for about 3 hours to 95-100° C., while well stirring. After it has cooled 15 parts of anhydrous sodium carbonate are added thereto and the pyridine is blown off with steam. Thus a red solution is obtained, which is evaporated to dryness in order to prepare therefrom the sodium salt of the sulfuric acid ester of leuco-dimethoxydibenzanthrone.

Instead of the above cited leuco compounds of tetrabromindigo, thio-indigo and dimethoxydibenzanthrone, any other leuco compounds of vat dyestuffs, in general all those of the indigo, indigoid, anthraquinone, quinone anilide and like class can be used with a similar result. Likewise, instead of pyridine, any other organic base, such as dimethylaniline, diethylaniline etc. may be used.

What I claim is:

1. A process for the manufacture of stable derivatives of vat dyestuffs soluble in water, consisting in treating a leuco compound of a vat dyestuff with aminosulphonic acid in the presence of a tertiary organic base.

2. A process for the manufacture of stable derivatives of vat dyestuffs soluble in water, consisting in treating a leuco compound of an indigoid vat dyestuff with aminosulphonic acid in the presence of a tertiary organic base.

In witness whereof I have hereunto signed my name this 25th day of February, 1927.

ARTHUR WOLFRAM.